US010654665B2

(12) United States Patent
Nemati et al.

(10) Patent No.: US 10,654,665 B2
(45) Date of Patent: May 19, 2020

(54) SYSTEM AND METHOD FOR AUTOMATICALLY RESTOCKING ITEMS ON SHELVES USING A PNEUMATIC PIPE SYSTEM

(71) Applicant: Walmart Apollo, LLC, Bentonville, AR (US)

(72) Inventors: Behzad Nemati, Springdale, AR (US); Ehsan Nazarian, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 76 days.

(21) Appl. No.: 15/971,357

(22) Filed: May 4, 2018

(65) Prior Publication Data

US 2018/0319607 A1 Nov. 8, 2018

Related U.S. Application Data

(60) Provisional application No. 62/502,204, filed on May 5, 2017.

(51) Int. Cl.
| | |
|---|---|
| *G06F 7/00* | (2006.01) |
| *B65G 51/32* | (2006.01) |
| *B65G 51/46* | (2006.01) |
| *B65G 1/137* | (2006.01) |
| *G05B 19/418* | (2006.01) |
| *G06Q 10/08* | (2012.01) |

(52) U.S. Cl.
CPC ........... *B65G 51/32* (2013.01); *B65G 1/1371* (2013.01); *B65G 1/1376* (2013.01); *B65G 51/46* (2013.01); *G05B 19/4182* (2013.01); *G05B 19/4183* (2013.01); *G05B 19/4189* (2013.01); *B65G 2203/041* (2013.01); *B65G 2812/16* (2013.01); *G06Q 10/087* (2013.01)

(58) Field of Classification Search
None
See application file for complete search history.

(56) References Cited

U.S. PATENT DOCUMENTS

| | | |
|---|---|---|
| 5,725,124 A | 3/1998 | Bustos et al. |
| 6,711,460 B1 | 3/2004 | Reese |
| (Continued) | | |

FOREIGN PATENT DOCUMENTS

EP 2011748 A1 1/2009

OTHER PUBLICATIONS

International Search Report and Written Opinion dated Jul. 30, 2018 in corresponding International Application No. PCT/US18/31172 (18 pp).

(Continued)

*Primary Examiner* — Yolanda R Cumbess
(74) *Attorney, Agent, or Firm* — Venable LLP; Jeffri A. Kaminski (57) ABSTRACT

Systems, methods and computer-readable media for automating the restocking of shelves process by sending a notification when a product on a shelf has reached, or will reach, an undesired level of emptiness. This is determined using imaging sensors, such as cameras, which can calculate how full or empty a respective shelf is and predict when the shelf will need to be restocked. When the restocking time arrives, the notification can be sent to automated systems, which automatically cause new products to be stocked on the shelf via a pneumatic pipe system.

20 Claims, 6 Drawing Sheets

(56) References Cited

U.S. PATENT DOCUMENTS

| | | |
|---|---|---|
| 8,494,672 B2 | 7/2013 | Chirnomas |
| 2004/0128025 A1 | 7/2004 | Deal |
| 2009/0063307 A1 | 3/2009 | Groenovelt et al. |
| 2013/0039543 A1 | 2/2013 | Fuhr et al. |
| 2014/0006229 A1 | 1/2014 | Birch et al. |
| 2014/0108027 A1 | 4/2014 | Greyshock et al. |
| 2014/0129395 A1 | 5/2014 | Groenovelt et al. |
| 2014/0184818 A1 | 7/2014 | Argue et al. |
| 2014/0201041 A1 | 7/2014 | Meyer |
| 2015/0235157 A1 | 8/2015 | Avegliano et al. |
| 2016/0125683 A1 | 5/2016 | Jones |
| 2016/0253794 A1 | 9/2016 | Shekar et al. |
| 2016/0314419 A1* | 10/2016 | White .............. G06Q 10/06311 |
| 2016/0314514 A1* | 10/2016 | High .................. G06Q 30/0631 |
| 2017/0300984 A1* | 10/2017 | Hurwich .............. G06Q 10/087 |
| 2019/0215424 A1* | 7/2019 | Adato ..................... G06T 7/521 |
| 2019/0236531 A1* | 8/2019 | Adato ................ G06K 9/00664 |

OTHER PUBLICATIONS

Sumetzberger GmbH, "Pneumatic Tubes Meet Robotics: Fully Automated Pharmacy"; https://www.youtube.com/watch?v=OPhILg-G7J8; Jul. 3, 2016 (1 pp).

Kozlowski, I., "Construction and research of the laboratory model of pneumatic tube system with autonomous control system"; https://www.youtube.com/watch?v=-O3j576cM5g; Nov. 11, 2015 (1 pp).

\* cited by examiner

SYSTEM AND METHOD FOR AUTOMATICALLY RESTOCKING ITEMS ON SHELVES USING A PNEUMATIC PIPE SYSTEM

BACKGROUND

1. Technical Field

The present application relates generally to methods and systems for automatically restocking items on shelves using a pneumatic pipe system. More specifically, the present application relates to imaging shelves and initiating a pneumatic pipe system to restock the shelves with products when it is determined that the products should be restocked.

2. Introduction

In retail locations, items that are on display for users to purchase constantly must be restocked from storage or inventory areas. The process to manually restock items is time-consuming and often imprecise. For example, not all items get taken off the shelves at the same rate. Instead, some items are more in demand than others.

Further, items on display at retail locations can have different dimensions and occupy different space on display. For high volume items, retail locations may choose to dedicate more space than low volume items to minimize the frequency of restockings. But much of the restocking techniques and practices are insufficiently granular to maximize the efficiency of which items need restocking when.

What is needed are methods and systems for determining when an item needs to be restocked and for automatically initiating a pneumatic pipe system to restock the item.

SUMMARY

A method for practicing the concepts disclosed herein can include: receiving, from a plurality of imaging sensors, real-time imaging data, the real-time imaging data including images of a plurality of products on a store shelf, the plurality of products having a plurality of product types, wherein the plurality of imaging sensors: (1) detect motion of a human between an imaging sensor in the plurality of imaging sensors and the store shelf; (2) detect an end of the motion; and (3) wait a pre-determined amount of time after the end of the motion before recording the images; storing the real-time imaging data in a database, wherein the database contains item-specific data associated with each product in the plurality of products, the item-specific data including dimensions, weight, and orientation information of the each product; calculating, in real-time and for each product in the plurality of products, a current quantity of a product on the store shelf based on the real-time imaging data and the item-specific data; calculating a current depletion rate for each product in the plurality of products based on the current quantity of the each product, a previous quantity of the each product, and a historical sales rate of the each product; forecasting when an emptiness threshold for each product in the plurality of products will be reached based on the current depletion rate for the each product and the current quantity of the each product, to yield a plurality of forecasted replenishment times, each forecasted replenishment time in the plurality of forecasted replenishment times identifying when a respective product in the plurality of products will reach the emptiness threshold; and at each forecasted replenishment time in the plurality of forecasted replenishment times: generating an alert for restocking the respective product via a pneumatic pipe system; and triggering the pneumatic pipe system to restock the respective product based on the alert.

A restocking system configured as disclosed here can include: a plurality of imaging sensors configured to capture imaging data of items on store shelves; a database having item-specific data stored, the item-specific data including dimensions, weight, and orientation information of the items; a processor; and a computer-readable storage medium having instructions stored which, when executed by the processor, cause the processor to perform operations comprising: storing the imaging data in the database; calculating a current quantity of a product on the store shelves based on the imaging data and the item-specific data; calculating a current depletion rate for the product based on the current quantity of the product, a previous quantity of the product, and a historical sales rate of the product; forecasting when an emptiness threshold for the product will be reached based on the current depletion rate and the current quantity of the product, to yield a forecasted replenishment time; and at the forecasted replenishment time: generating an alert for restocking the respective product via a pneumatic pipe system; and triggering the pneumatic pipe system to restock the respective product based on the alert.

A non-transitory computer-readable storage medium configured as disclosed herein can have instructions stored which, when executed by a processor or computing device, can cause the processor to perform operations including: receiving, from a plurality of imaging sensors, real-time imaging data, the real-time imaging data including images of a plurality of products on a store shelf, the plurality of products having a plurality of product types, wherein the plurality of imaging sensors: (1) detect motion of a human between an imaging sensor in the plurality of imaging sensors and the store shelf; (2) detect an end of the motion; and (3) wait a pre-determined amount of time after the end of the motion before recording the images; storing the real-time imaging data in a database, wherein the database contains item-specific data associated with each product in the plurality of products, the item-specific data including dimensions, weight, and orientation information of the each product; calculating, in real-time and for each product in the plurality of products, a current quantity of a product on the store shelf based on the real-time imaging data and the item-specific data; calculating a current depletion rate for each product in the plurality of products based on the current quantity of the each product, a previous quantity of the each product, and a historical sales rate of the each product; forecasting when an emptiness threshold for each product in the plurality of products will be reached based on the current depletion rate for the each product and the current quantity of the each product, to yield a plurality of forecasted replenishment times, each forecasted replenishment time in the plurality of forecasted replenishment times identifying when a respective product in the plurality of products will reach the emptiness threshold; and at each forecasted replenishment time in the plurality of forecasted replenishment times: generating an alert for restocking the respective product via a pneumatic pipe system; and triggering the pneumatic pipe system to restock the respective product based on the alert.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Systems, methods and computer-readable media configured as disclosed herein can automate the restocking process by sending a notification when a product on a shelf has reached an undesired level of emptiness. The notification can then alert an automated pneumatic pipe system which automatically moves products from a storage room to their desired location on the store shelf.

To identify when the amount of product on the shelf has reached, or predict when the amount will reach, the emptiness threshold, image sensors (such as video cameras) are used. These sensors take pictures, photographs, or other images of the shelf, then transmit those images to a computer system (such as a server) which stores product data for the products on the shelf, such as the size, orientation, color, volume, etc., of the products. Using the captured image and the product data, the computer system can calculate the current shelf inventory for a given product. For example, a camera can be positioned to view a particular type of cereal on a grocery store shelf. The camera can take a picture of the shelf, including the cereal currently on the shelf, and send that picture over a network to a server. The server can then identify the products contained within the image based on the colors, shapes, sizes, writing, contained on the products, and can retrieve data associated with the dimensions of the products based on that identification. The server can then, using the image, the dimensions, and the known identity of the product, calculate the number of cereal boxes currently on the shelf. If the current number of cereal boxes is below the emptiness threshold, a notification to restock the shelf with that cereal can be generated.

While the above example is a viable use of the concepts disclosed herein, a preferred configuration uses the image sensors to assist in forecasting when the product will need to be restocked. In such a configuration, and as above, the image sensors record images of a product on a shelf. However, rather than only making a binary decision regarding the current inventory being above or below the emptiness threshold, the system also can record the current inventory and use that information to predict when the product is going to need restocking. For example, the image sensors can record an image of a product on a shelf, access the dimensions of the product from a database, and calculate the current shelf inventory available. At a later time, the image sensors can record a new image of the product on the shelf, and a newly updated shelf inventory. Based on factors such as the difference in the shelf inventories, the time between the images/shelf inventory calculations, historical sales data, calendar information (weekday versus weekend versus holiday), marketing information, etc., the server can calculate a real-time depletion rate for the product. Using the real-time depletion rate for the product and the current (most recent) shelf inventory, the server can calculate when the shelf inventory is going to reach the emptiness threshold when restocking needs to occur.

This process of calculating the real-time depletion rate and forecasting when the restocking will need to occur can, in some configurations, rely on machine learning to iteratively improve the forecast being made. For example, in a configuration using a machine learning process to forecast when the emptiness threshold will be reached, one or more models can be used to predict when a shelf will need to be restocked. One exemplary model can be a time-series model, which relies on the current rate of product depletion based on current and past inventory levels. Another exemplary model can be a machine learning model, which uses input factors such as the current inventory level, the current depletion rate, historical sales, marketing data, etc., assigns weights to each of the input factors, and makes a prediction using the weighted factors. Upon receiving subsequent, actual data regarding when the restocking needed to take place, the weights or other parameters of the machine learning model can be updated, resulting in a more accurate/efficient machine learning model. Such models can be implemented in parallel (i.e., the time series modeling can occur in parallel to the machine learning modeling), and the system can select a model based on past results, such that the most accurate model for a given situation or circumstance is selected.

Notifications to restock the shelf can, for example, be sent across a network to the pneumatic pipe system. This notification can be sent via a wireless network and/or via a wired network, and such networks can include the media required for the imaging sensors to communicate the image to a central computing system. For example, the imaging sensors can record an image, transmit that image wirelessly to a central server which perform an image comparison to determine the relative emptiness of the shelf, and the central server can then send a wireless notification to the pneumatic pipe system to move merchandise from a storage location to the shelves via pneumatic pipes.

These and other aspects of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention. Having provided an overview of the invention, the disclosure now turns to the illustrated figures.

Figure 1:
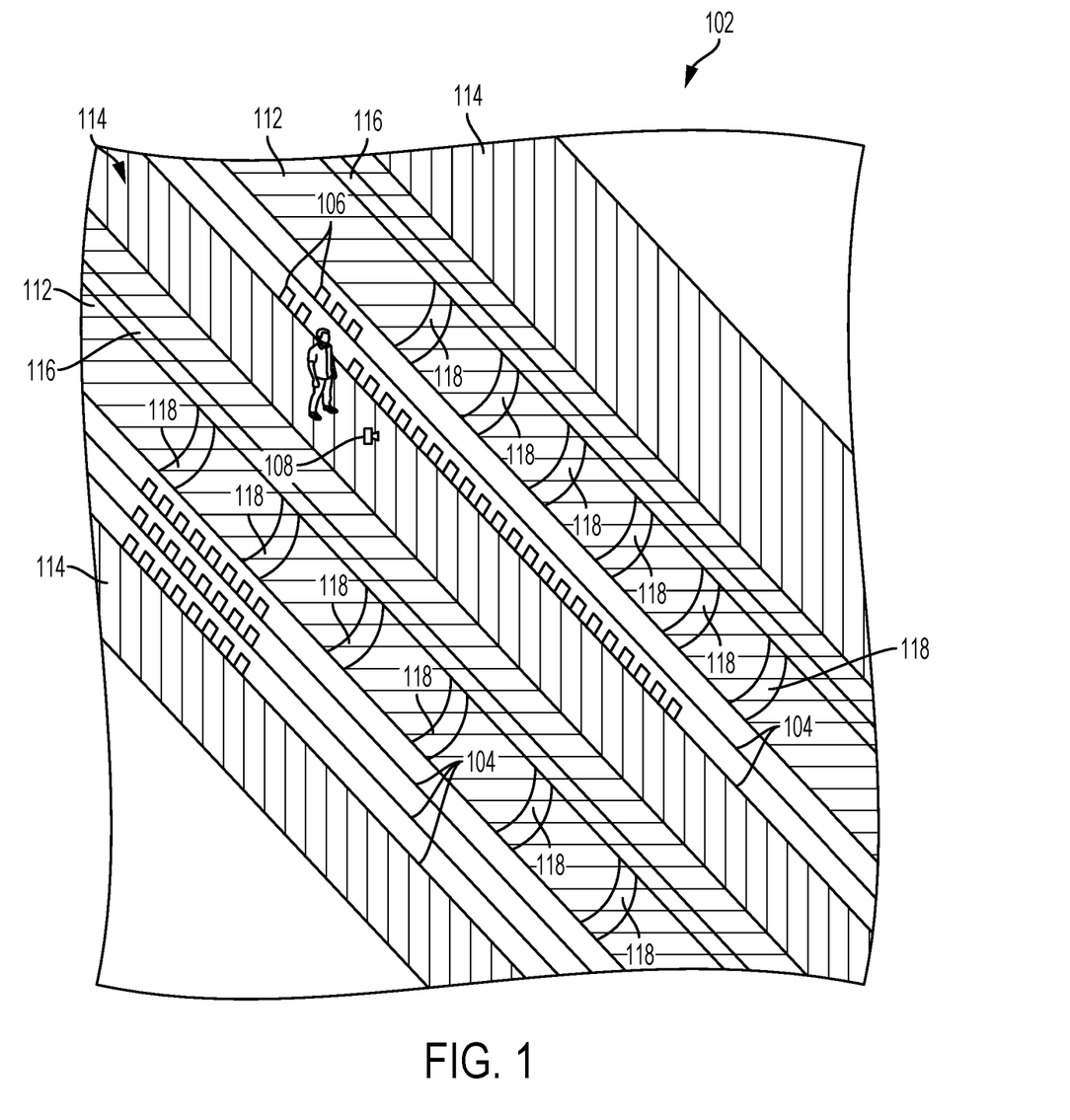
FIG. 1 illustrates a perspective view of aspects of a pneumatic pipe restocking system in a retail environment, according to an embodiment of the invention.

As shown in FIG. 1, a restocking system 102 can include a plurality of imaging sensors 108. Each imaging sensor 108 can be configured to capture images of items for purchase 106 on a respective shelf 104 of an aisle 114. The imaging sensor 108 can be placed such that it is located over the aisle 114 (as illustrated), or can be placed on a shelf 104. In yet other configurations, the imaging sensor 108 can be located on the wall 112 forming the back of the shelf 104, with the ability to capture images of items 106 across the aisle. Those imaging sensors 108 which are on a shelf 104 can be looking at the items 106 which are on the shelf 104 with the sensor 108 or at items 106 on a shelf 104 across the aisle 114. The imaging sensors 108 may also be mobile, for example, mounted on a robot or autonomous vehicle.

In an exemplary embodiment the image of the current state of the shelf may be compared with that of an empty shelf. An empty/full percentage may be determined based on how closely the two images match and in what areas. For instance, the system may notice that the bottom of the shelf is partially visible and based on the percentage of that area, compared to the whole shelf area and the dimensions of the item associated with that shelf, the system may calculate a number of items missing. In another scenario, the back of the shelf might be visible and again, based on the percentage of the visible area and item's dimensions, the system may calculate a different number. Differentiating between different sections of the shelf and weighting them differently while calculating the empty/full percentage may be used to determine when to re-stock. This comparison process may be used in combination with the item count process. The results can be reconciled with each other to obtain a more accurate result.

The imaging sensor 108 can include a camera for recording video or capturing images. The camera can be an analog camera or a digital camera. The imaging sensors 108 can be configured to capture images of the items for purchase 106 on a periodic time interval. Systems that monitor through video or picture footage can require tremendous data storage and retrieval capabilities in computer systems. Transmitting video or image files over networks can consume a large amount of bandwidth because video and image files of items in a retail location can typically be quite large. For example, uncompressed video with the resolution of 720×486 pixels at 29.97 frames per second with 8 bit pixel encoding requires about 20 MB per second to transmit, or 70 GB per hour. In some configurations, such bandwidth requirements can be reduced by transmitting item-specific information. For example, the imaging sensor 108 may only transmit images associated with a particular product, or may retain the most recent image within an internal memory, and only transmit a new image when a change has occurred. In yet other configurations, the imaging sensor can capture images at a regular or irregular intervals (i.e., periodically), which can allow the computational workload and storage to become more efficient, allowing more devices to access the system and provide faster processing times. In one configuration, the periodic time interval for capturing images can have a default value of (approximately) every hour. In yet other configurations, the periodic time interval for an aisle can decrease as the motion that is detected in the aisle increases. For example, the default rate of capturing an image every hour can be maintained until a threshold number of people are detected on the aisle, at which point the system changes the periodic interval to every ten minutes, until a predetermined amount of time passes and the default periodic time period is restored.

To restock the items, the wall (or base) 112 of the shelving structures can be integrated with a pneumatic pipe system which can carry items being restocked from a stock room or other location to the shelves 104 where the items are displayed to consumers. In one configuration, the pneumatic pipe system includes a main pneumatic pipe 116 for each respective shelving unit (i.e., a wall or back panel 112 plus the shelves 104 themselves), as well as branches 118 which extend from the main pneumatic pipe 116 to specific locations on the respective shelves 104. The pneumatic pipe network can connect shelves of a retail area to a storage area.

In some configurations, the movement of items on the pneumatic pipe system can be hidden from public view. For example, the main pneumatic pipe 116 and the smaller pneumatic branches 118 can be on top of the wall 112 or backpanel, whereas in other configurations the pneumatic pipe system can be contained within the wall 112 or backpanel. In yet other systems, the pneumatic pipe system can be implemented at the space at the rear of individual shelves 104, near the wall (i.e., between the displayed products 106 and the wall 112). The size of the pneumatic pipe system can vary throughout a store based on the dimensions of the products on a given shelf. For example, the shelves 104 in a first part of a store may carry small products, and therefore be configured with a small pneumatic pipe system, whereas in a second part of the store shelves 104 may carry larger products, and the pneumatic pipe system may be larger/wider to be able to carry the products.

Figure 3:
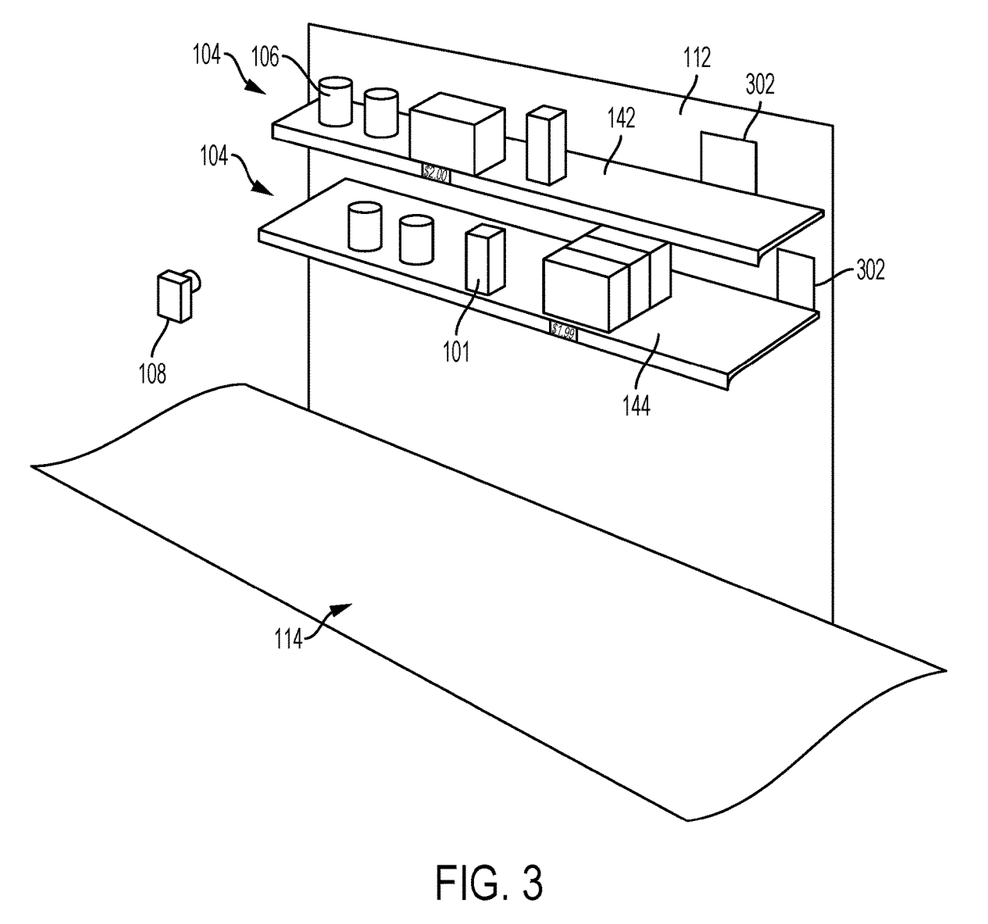
FIG. 3 illustrates a close-up perspective of the pneumatic pipe restocking system in a retail environment, according to an embodiment of the invention.

The pneumatic pipe system can be at least partially behind the wall 112 adjacent to the shelf 104. For example, the pneumatic pipe 116, 118 can at least partially be disposed behind the wall 112. The pneumatic pipe system can include a door mechanism 302 connecting the shelf 104 to the pneumatic pipe 116, 118. The door mechanism 302 can have a single hinge that opens the wall 112 of the aisle, where a door swings either backwards into the wall cavity or frontward into the shelving area. In some embodiments, the door is able to swing forward because the shelving immediately in front of the door is sufficiently empty of the item that is being replenished that it allows for the door to open. Alternatively, the door mechanism 302 can comprise a trap door. Alternatively, the pneumatic pipe 116, 118 can transport the items from directly above onto the shelf 104 or it can transport the items from underneath the shelf onto the shelf 104.

The pneumatic pipe system can, in some configurations, have windows/doors/gates that would open to let the items be carried to their designated locations on the shelf 104. These windows/doors/gates would then close after the product is delivered. In addition, all the shelves 104 on the same wall 112 can be supplied by the same pneumatic pipe 116 as long as sorters/pushers/diverters are available to push the items into the right shelf at the appropriate location. The sorters/pushers/diverters can be, for example, a flap or other diverting system which directs the item from the pipe 116, 118 into the shelf at the desired location. Such sorters/pushers/diverters can be used in conjunction with, or as an alternative to, the windows/doors/gates described. The pneumatic system can include a sorter at the door mechanism 302 that pushes items onto the shelf from the pneumatic pipe network or the pneumatic pipe 116, 118.

Figure 2:
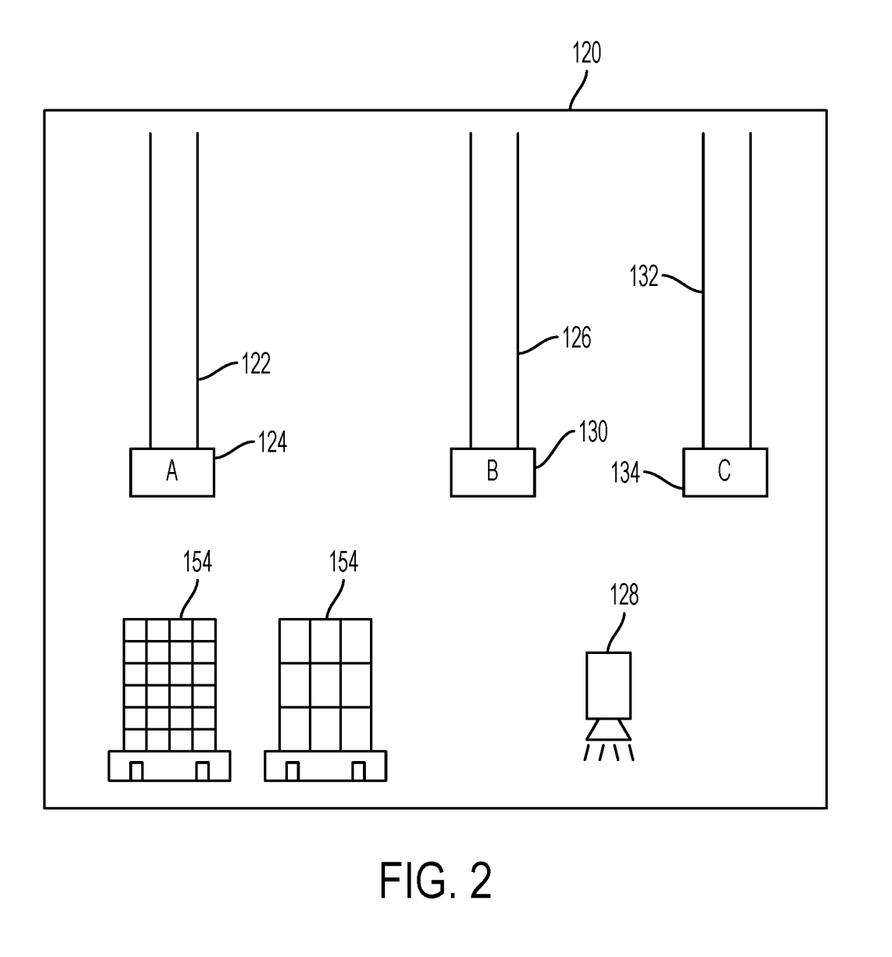
FIG. 2 illustrates a perspective view of aspects of a restocking system in a storage environment, according to an embodiment of the invention.

FIG. 2 illustrates a perspective view of aspects of a restocking system in a storage environment 120 using a pneumatic pipe system, according to an embodiment of the invention. In this example, products 154 are arranged on pallets within a storage facility 120. A camera 128 or other imaging sensor is used, which can identify the location of the items which need to be restocked within the storage area 120. In some cases, the notification received which identifies an item as needing to be restocked can result in moving product from one specific bin or location to another at a single facility, such as movement within a distribution center, retail location, or other facility (i.e., movement from one storage room to another storage room). In other cases, this notification can result in moving product from one facility to another, such as moving product from a distribution center to a retail location, or requesting additional product from a manufacturer for delivery to a distribution center. All such movements can be performed using a pneumatic pipe system as described herein.

For example, the camera 128 can be configured to move between pallets of merchandise within the storage area 120, and can be used to confirm a current location of a desired item within the storage area 120. Once the camera 128 scans and identifies the item, a movement mechanism can move the desired item from its storage location to a pick point 124, 130, 134. Exemplary movement mechanisms can include a pushing/rolling system, a drone, a mechanical arm, or any other mechanism capable of moving the item, either individually or in bulk (i.e., the mechanism can move a pallet or bundle of the items). The movement mechanism moves the item(s) to a pick point 124, 130, 134, which is a location having access to respective pneumatic pipes 122, 126, 132.

The relative sizes of the pneumatic pipes 122, 126, 132 associated with each pick point 124, 130, 134 can vary to accommodate distinct sizes of products. For example, small items can be delivered to pick point A 124, which allows a smaller pneumatic pipe 122 to transport the small items to their designated shelves. Likewise, medium items can be delivered to pick point B 130 for transport via pneumatic pipe 126, which is slightly larger than the small pneumatic pipe 122. Larger items can be delivered to pick point C 134 for transportation of still larger items via a large pneumatic pipe 132.

The pneumatic pipes 122, 126, 132 can pick the items up from the pick points 124, 130, 134 and deliver them to the respective shelf or shelves where the items need to be restocked. In some configurations, the pneumatic pipes 122, 126, 132 can branch between the pick points 124, 130, 134 and the shelf where the products need to be delivered. The delivery of the products through the branching pneumatic pipes can be enabled using a combination of flaps, diverters, or other mechanisms known in the art. As the products travel through the pneumatic pipe system to from the pick points 124, 130, 134 to their destinations, scanners within the pneumatic pipes can identify items and adjust flaps/diverters accordingly. In some configurations, items can be delivered individually, whereas in other configurations the items can be delivered in groups. For example, in one configuration, the items can be delivered in groups four feet (1.21 meters) long, whereas in another configuration, each individual item progresses through the pneumatic pipes individually.

In yet other configurations, the pneumatic pipes 122, 126, 132 can be configured to carry specific types of packages. For example, one pipe within a pneumatic pipe system can be configured to move canned food, whereas another pipe can be configured to distribute cereal boxes. In some configurations the pneumatic pipes can be preconfigured to carry specific items, such that the size of the tubes is static. In other configurations, the pneumatic pipes can change shape/size based on the product being transported (i.e., the pneumatic pipe can be dynamic). For example, a pipe may be configured to carry both cans of soup and slightly larger cans of tomato sauce. When a notification to restock soup is received, the associated pneumatic pipe can be adjusted to match the required diameter for moving a can of soup. When a distinct notification indicates restocking of the tomato sauce needs to occur, the same pneumatic pipe can be modified to have a diameter needed for moving tomato sauce cans (i.e., a larger diameter than required for cans of soup).

FIG. 3 illustrates a close-up perspective of the restocking system in a retail environment, according to an embodiment of the invention. As illustrated, each shelf 104 can have a rear portion 142 that is adjacent to a wall 112 and a front portion 144 that is adjacent to an aisle 114. In one configuration, the imaging sensors, or cameras, 108 can be positioned across the aisle 114 from the shelf 104 being monitored. In such configurations, the camera 108 can have a view of multiple shelves or a single shelf, can view many products being stored on the shelves or a single product. In one configuration, the camera 108 is positioned to view all of the products from the top to the bottom of the shelving unit across the aisle 114. In another configuration, the camera 108 is positioned to view a single product on a single shelf 104 across the aisle 114. In yet other configurations, the position of each camera 108 can be placed to maximize coverage of the front portion 144 of the shelf 104, whereas in other configurations the position of the camera can be set to view both the front 114 and rear 142 portions of the shelf 104.

In some configurations, each camera 108 can be configured to take images at the front portion 144 of the shelf 104 immediately across the aisle. In other configurations, each camera 108 can be configured to rotate or move horizontally and/or vertically to take images of the shelves 104 across the aisle. Such motion can, for example, be on a set (i.e., periodic) schedule, or can be initiated upon detecting motion (i.e., when a human walks in front of a product). In other configurations, each camera 108 can be configured to record images for products on the shelf 104 where the camera 108 is located (i.e., looking backwards into the shelf rather than across the aisle 114).

The imaging sensor 108 and/or the computing system which receives the images can be configured to capture and/or read a barcode of the items 106, which can be used in counting the number of items on the shelf 104 (the current shelf inventory). For example, a processor can be specifically configured to qualitatively and quantitatively recognize the items on the shelf 104 based on the barcodes of the products within the images received by the imaging sensor 108. In other configurations, the computing system can identify the products 106 within the images based on the shape, color, location, dimensions, etc., of the products 106 in the images, then use that information to determine the number of products on the shelf 104. Yet other configurations can use a combination of barcodes, shape/size/dimension information, location information, and/or other information to determine what products were captured in the images and what the current shelf inventory is based on those images. Using this information, the system can determine current rates of depletion and estimate when the shelf is going to reach an emptiness threshold.

For example, the images captured can be caused to calculate a quantity of items on the shelves based on the captured imaging data and other item-specific data of the items. More specifically, the shelf can be imaged and depending on the dimensions, size, and outline of an expected item, the system can generate an alert when the image shows a predetermined level of emptiness for that item. An empty/full percentage may also be determined by comparing the current image of the shelf with an empty shelf. Based on how closely the image match and in what areas the amount of products on the shelf can be determined. Likewise, the system can forecast when an emptiness threshold has been or will be reached for a particular item on a shelf based on the calculated quantity of items on the shelf of the item. The threshold inventory for each item may calculated and updated using forecasting and machine learning algorithms Based on how items are and have been going off the shelves, the algorithms may update the threshold so that the lost sales due to items not being available for even a short period of time, is minimized. So the faster-selling items would get a higher threshold compared to the slower-selling items. The item count can be combined with the emptiness comparison to obtain a more accurate result.

The emptiness threshold can also be forecast based on historical rates of replenishment of the item and/or historical rates of the item being sold. This may be done on a per item basis. For example, the system can use patterns of information based on historical replenishment needs as stored in the decision support system. This information can be stored in a database and accessed in real-time, as the images are taken. This may include historical point of sale information, which may be tracked at the item level and with the date and time of purchase. This pattern information can be used for a particular calendar day of the previous year or series of years. For example, if the date is Jul. 1, 2017, pattern information for a particular item can be accessed for the previous July 1 (i.e., Jul. 1, 2017), or surrounding dates. Additionally, or alternatively, pattern information for the previous several years on July 1 can be accessed for an estimate of how often this particular item needed to be replenished on this date. This pattern information can serve as a foundation for how often this item should be replenished without first even looking at the imaging data.

For example, if a particular item is restocked once a day for the past 10 years on July 1, then the computer system can be configured not to process imaging data of the shelf for that particular item as often as other items with higher restocking needs. The restocking foundation for the particular day can be set to at least a fraction of the historical rate. Thus, if a previous replenishment rate need is once every six hours (twice a day), then the computer system can forecast that the item should be replenished every three hours to safely avoid the item being unavailable.

This same approach of identifying pattern information can be used with other days of the year. For example, a day of the year may be specified using any technique for identifying a day during the year. Thus, a particular day of the week of a given week for the year can be analyzed back in time. The day of a week may be the fifth day of the fourteenth week, e.g., a Thursday. Thus, the replenishment rate for the previous year or several years for the fifth day of the fourteenth week can be measured as a way of setting a default value for how often an item should be replenished. A day of a month may be measured. For example, if a particular day is the fifth day of the fifth month, a look back to the previous year or years for the fifth day of the fifth month can be analyzed. The same can be true of particular days of the month, e.g., the second Tuesday of the third month or the first day of the second week of the third month, etc. Then the analysis of the time going backward can be applied to a default replenishment time for the value.

The historical pattern analysis can apply an adjustment date for particular dates of prior year(s). Adjustment dates may be used in various ways. An adjustment date may specify that a particular day is not to be analogized if, for example, the date would result in the previous year's date landing on a holiday, e.g. July 4, then specifying July 4 as an adjustment date may result in the actual date being scheduled on a different day, e.g. July 3 or July 5. In one or more embodiments, a year having an adjustment date may be removed from consideration as historical analysis.

The adjustment date may comprise a holiday, a weekend day, or any other date specified as such on the prior year. The adjustment date may be based on at least one of a day of a week, a day of a month or a day of the year. The adjustment date may be manually specified.

By looking at the historical rates of replenishment items according to embodiments of the invention with the contemplated date adjustments and particular date lookbacks, significant time and resource savings are possible. Even less reliance on the imaging of the items is required with accurate historical data. This can save additional surveillance resources and/or allow for more narrowly tailored surveilling. For example, with historical data that is trained over time to provide an accurate forecast of when an item needs to be restocked, the imaging sensors can be configured to capture imaging data of the item in fractions of the frequency. This capturing the imaging data at a fraction of the rate can be used to verify that the items do not need to be restocked. In other words, the capturing the imaging data can be used as a fallback position to the training of the automated replenishment system based on historical data alone.

Besides historical data of purchases of items, historical data of traffic within an aisle can be used as a weight in forecasting the demand to replenish an item. For example, the system can determine of the total foot traffic detected by a human motion detector, how much of the traffic contributes to each item in the aisle. And by tracking how much foot traffic is in the aisle in real-time, the system can predictively forecast how often a particular item should be restocked.

Another weight that can be incorporated into the forecasting analytics is point of sale of a particular product. Spikes or aberrations in point of sale purchases for a particular item compared to previous years can prompt the image sensor to capture imaging data of that particular item having the spike or aberration in purchase. For example, if a particular item is rarely replenished during the day, the imaging sensor may be set to monitor the item once a day (at 2:00 PM). But if a massive amount of purchases for that item takes place at 9:00 AM, then the imaging sensor can be prompted to take a picture of that item early.

The system can use one or more of the above weights in determining when a particular item is ready to be restocked. When this determination has been made, the system can be caused to generate an alert for restocking the item based on when the emptiness threshold is determined to be reached. The generated alert can be an electronic communication to a client personal device. The system can have, for example, one or more Internet servers for communicating with the client personal device via the Internet. Similarly, the computer system can have one or more mobile servers for communicating with client personal device via a mobile network (e.g., GSM, PCS, Wi-Fi, WPAN, etc.). In some embodiments, one server may be able to communicate with the client personal device over both the Internet and a mobile network. In other embodiments, separate servers can be used.

Once a notification has been generated and sent to the conveyor system, the conveyor system automatically restocks the item based on the generated alert. This automatic restocking of the item via a conveyor belt can further utilize robots or other mechanical function machines that can transport items from a storage area to the shelf of interest as part of the conveyor system.

Once a notification has been generated and sent to the pneumatic pipe system, the pneumatic pipe system automatically restocks the item based on the generated alert. This automatic restocking of the item via a pneumatic pipe can further utilize robots or other mechanical function machines that can transport items from a storage area to the shelf of interest as part of the pneumatic pipe system.

The imaging sensors 108 can be activated to capture images after a predetermined time of the motion detectors 116 detecting motion in the respective aisle. For example, the predetermined time can be in a range of between about 10-20 seconds. In addition, the system can be configured to cause the periodic time interval to vary depending on the detected motion in the aisle. For example, if a relatively high amount of human motion was detected, the periodic time interval can increase, whereas if a relatively low amount of human motion was detected (i.e., the person walked right by the sensor) the interval can remain at the set interval or can decrease.

In some cases, the imaging sensor 108 can operate as a motion detector, whereas in other cases a distinct motion detector can detect activity on the aisle 114, which "wakes up" the imaging sensor 108 from a sleep/inactive mode.

The system can use machine learning to train the interval at which each of the imaging sensors captures images of the items on the shelves based on detected human motion and based on the detected quantity of items on the shelf. Machine learning helps ensure that the system adapts to the changes in customers' shopping habits, changes in store operations that could affect re-stocking times and other foreseen and unforeseen factors that would affect the optimal threshold for each item. It significantly improves customer satisfaction, and overall store operations while reducing the workload.

The sensor system may collects data points each time a motion is detected a customer passes by. The collected data points are then used as an input in the machine learning algorithms (80%, older data points are used for training and 20%, newer ones are used for testing) the algorithms would output the amount of time the system would wait after sensing a motion, to activate the camera(s). This time is then compared to the average sales intervals for each item and the minimum of the two are used to activate the cameras.

The system receives the data from databases, performs the analysis on the historical data, finds the most accurate model and settings and uses that to forecast the demand (next purchase) as well as the on-shelf inventory threshold. Once the new purchase/sale is completed, based on how accurate the forecast was, either the next one is forecasted or the system re-runs and re-calibrates the models. Once the on-shelf inventory goes below the threshold, a notification would go out to trigger the re-stocking.

The system can use databases, or data storage devices, to store a predefined image of the shelf in a full state according to a predetermined configuration. This full image can then be used as a reference for determining the emptiness threshold of a particular item, or for determining a percentage of emptiness.

After constant human motion in an aisle is detected for a first predetermined time, the system can be configured to cause the imaging sensor to initiate constant surveillance of the aisle for the space of a second predetermined time. For example, if the system detects human motion for two minutes, the system can initiate constant surveillance for a subsequent twenty seconds.

The system can be further configured to store information from point of sale of the items. Determining when an emptiness threshold for a particular item will be reached can be, for example, further based on the point of sale information. For example, if the system has detected multiple sales of an item but has not yet updated the shelf inventory using the disclosed imaging sensors/camera systems, the system can update the current shelf inventory and/or the depletion rate, and in turn update the forecast time when restocking will need to occur.

The re-stocking system can include a scale for determining the physical weight of the items on the shelves. The scale can be embedded into the shelves or can be overlaid on top of the shelves. The scale can be communicatively coupled to the system, and the data from the scale can be used with the images obtained to form a more complete view of the current shelf inventory.

For example, the notification can be generated based on the determined physical weight of the items on the shelf and the images of the items. The notification can be generated based on a scoring between the physical weight of the items and the images of the items reaching a predetermined threshold. The system can be configured to adjust the score of the at least one item differently depending on lighting, size, shape and physical weight of the items, and wherein the physical weight and the images of the items have a default scoring value.

When an item of interest has a default weight value that exceeds a predetermined physical weight, the physical weight of the items is given more weight than the physical weight default scoring value. This can be because items with greater physical weight can more accurately be determined to be taken from the shelf, especially with scales with low sensitivity. For example, a predetermined physical weight can be set for four pounds. When an item that has a default weight of five pounds (e.g., a bag of sugar), the scoring process can take account of the physical weight as part of the scoring process in determining whether the emptiness threshold has been met for that item. So if the scoring process for determining the emptiness threshold has a default configuration of assigning 50% to the imaging data of that item and 50% of the weight on the shelf for that item, that item being five pounds by virtue of exceeding the weight threshold of four pounds could now have a 40% assigned scoring value to the imaging data and 60% to the weight on the shelf for that item. In this manner, when the scale determines that one or more of these heavy objects have been removed, there is a greater likelihood that an emptiness threshold for this item is being approached than if an item weighing a few grams has been removed from the shelf.

At the same time, when the lighting of an aisle is less than a predetermined threshold (e.g., when the aisle is darker and the items on the shelves not as recognizable), the images of the items can be given less weight than the images default scoring value. This can be because of the inherent drop in accuracy in identifying emptiness from imaging data with a darker image. In this case, if a particular aisle is dark, a default 50% weighting for imaging data can be dropped to 40%, allowing for other factors to be more dispositive in determining the emptiness threshold.

Figure 4:
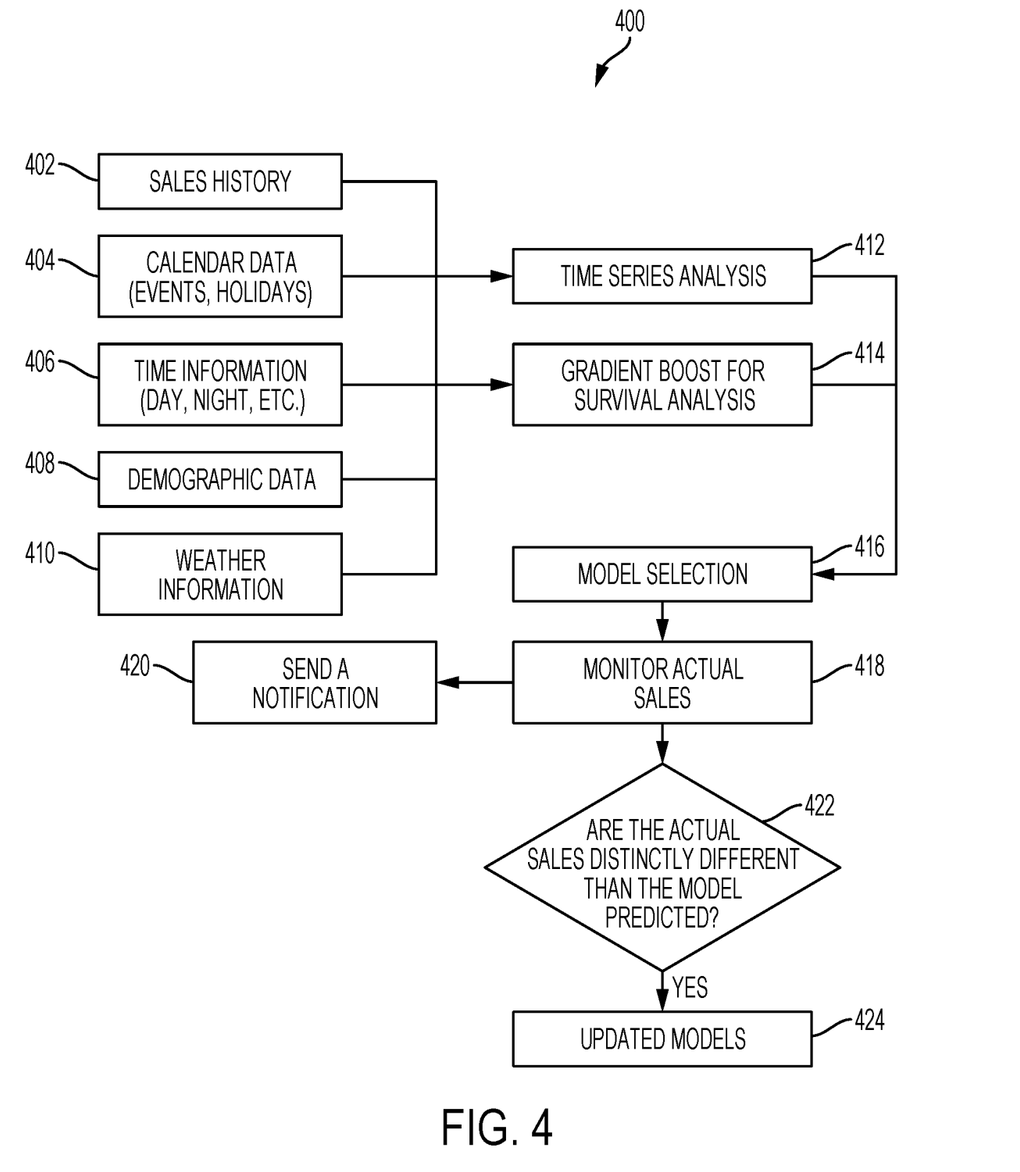
FIG. 4 illustrates an exemplary flowchart of processes associated with a restocking system, according to an embodiment of the invention.

FIG. 4 illustrates an exemplary flowchart of processes associated with a restocking system, according to an embodiment of the invention. More specifically, FIG. 4 illustrates a flowchart 400 of how a notification can be generated regarding a forecasted restocking schedule. In this example 400, the system feeds information such as sales history 402, calendar data (events, holidays) 404, time information (day, night, current time) 406, demographic data 408, and/or weather information 410 into various models 412, 414. As illustrated, the models can include a time series model 412 constructed via a time series analysis. Another exemplary model can be a gradient boost for survival analysis model 414. These and other models can be machine learning models which use parameters to weight the inputs 402-410, where the parameters are iteratively updated based on new data. The modeling 412, 414 can, for example, occur in series or in parallel.

With the models 412, 414 constructed, the system makes a model selection 416. This selection can, for example, be based on the historical performance of the models in accurately forecasting the need to restock. The historical data used to make the selection can be the entirety of the historical data available, or can be over a relevant time period. For example, in some configurations, the system may only use the most recent three months of sales data, whereas in other configurations the system uses all the historical sales data available. In yet other configurations, the system can use sales data specific to the current circumstances, such as sales data associated with calendar information (i.e., holidays, weekends, etc.), marketing information, etc.

Selection of a model 416 establishes the forecasted point at which products on the shelf will need to be restocked (aka, the emptiness threshold). With this forecasted time identified, the system monitors actual sales 418 and, upon arriving at the forecasted time, generates and sends a notification 420 regarding the product needing to be restocked. More specifically, the notification 420 is sent to automation tools which will automatically restock the product via a pneumatic pipe system.

The system also, in monitoring actual sales 418 of the product, compares the forecasted restocking time, depletion rate, and/or other factors predicted by the models 412, 414, with the actual data. The comparison is specifically looking to identify if the actual sales are distinctly different than the sales predicted by the model 422, or if the forecast time to restock the product is distinct than the time when the product actually needed to be restocked. If the forecast predictions are outside of a threshold range to the actual point where restocking needs to occur, the models can be updated 424. In practice, this can require (1) altering the parameters used to weight the input factors to better match the historical data, (2) modifying the computer algorithm which receives data and produces the forecast to more efficiently process the data, and/or (3) modifying an FPGA or other re-programmable computing device. Regardless of how the machine learning process iteratively updates the modeling process, the updated models present improved forecasting.

Figure 5:
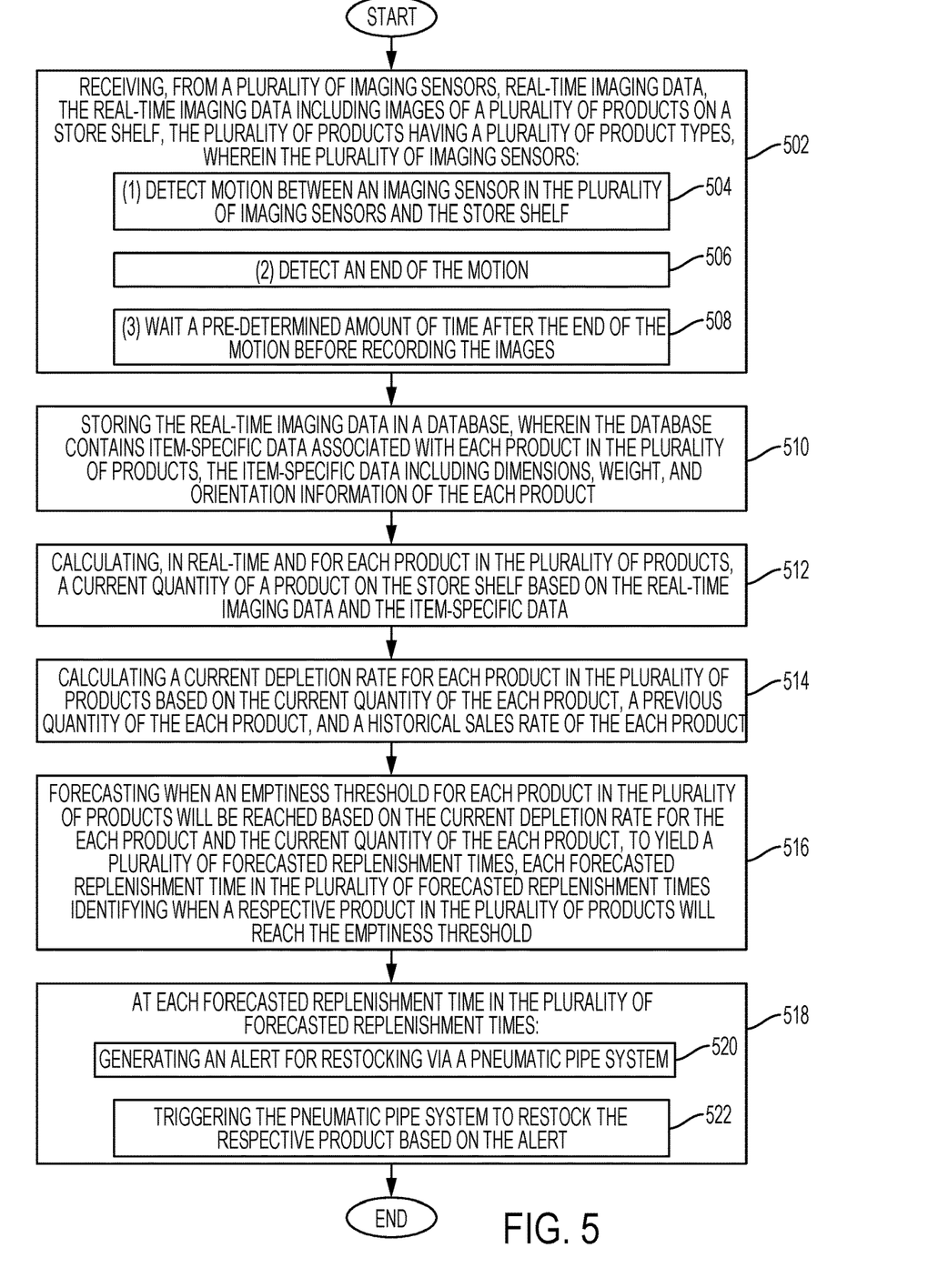
FIG. 5 illustrates an example method embodiment.

FIG. 5 illustrates an example method embodiment which can be practiced by a server or other computing device configured according to the concepts disclosed herein. In this example, the server receives, from a plurality of imaging sensors, real-time imaging data, the real-time imaging data including images of a plurality of products on a store shelf, the plurality of products having a plurality of product types, wherein the plurality of imaging sensors (502): (1) detect motion between an imaging sensor in the plurality of imaging sensors and the store shelf (504); (2) detect an end of the motion (506); and (3) wait a pre-determined amount of time after the end of the motion before recording the images (508). The imaging sensor can, for example, include a camera which is positioned across an aisle from the store shelf it is monitoring. In some configurations, the pre-determined amount of time can be in a range of between about 10-20 seconds, whereas in other configurations the pre-determined amount of time can be other durations.

The server then stores the real-time imaging data in a database, wherein the database contains item-specific data associated with each product in the plurality of products, the item-specific data including dimensions, weight, and orientation information of the each product (510). The server calculates, in real-time and for each product in the plurality of products, a current quantity of a product on the store shelf based on the real-time imaging data and the item-specific data (512), and also calculates a current depletion rate for each product in the plurality of products based on the current quantity of the each product, a previous quantity of the each product, and a historical sales rate of the each product (514). The server then forecasts when an emptiness threshold for each product in the plurality of products will be reached based on the current depletion rate for the each product and the current quantity of the each product, to yield a plurality of forecasted replenishment times, each forecasted replenishment time in the plurality of forecasted replenishment times identifying when a respective product in the plurality of products will reach the emptiness threshold (516). In some configurations, this forecasting can use multiple, distinct models, each of which can predict distinct times, and the server can select from amongst the models based on historical performance. Some of the types of models can be machine learning models which are used to forecast the replenishment/restocking times. The machine learning models can be updated based on actual sales of the products. Such updates can occur on a periodic basis (i.e., updates occur on a weekly, monthly, or other time period, basis) or on a varied basis, such as when a threshold amount of data is received.

At each forecasted replenishment time in the plurality of forecasted replenishment times (518), the server: generates an alert for restocking via a pneumatic pipe system (520) and triggers the pneumatic pipe system to restock the respective product based on the alert (522).

In some configurations, the plurality of imaging sensors further capture a duration of the motion, and wherein capturing of the images only occurs when the duration of the motion exceeds a motion duration threshold. In yet other configurations, the plurality of imaging sensors are dormant until an aisle entrance motion detector detects a presence of an individual on an aisle containing the store shelf, at which time the plurality of imaging sensors can be "woken up," and capture images of the products on the shelf as disclosed herein.

Figure 6:
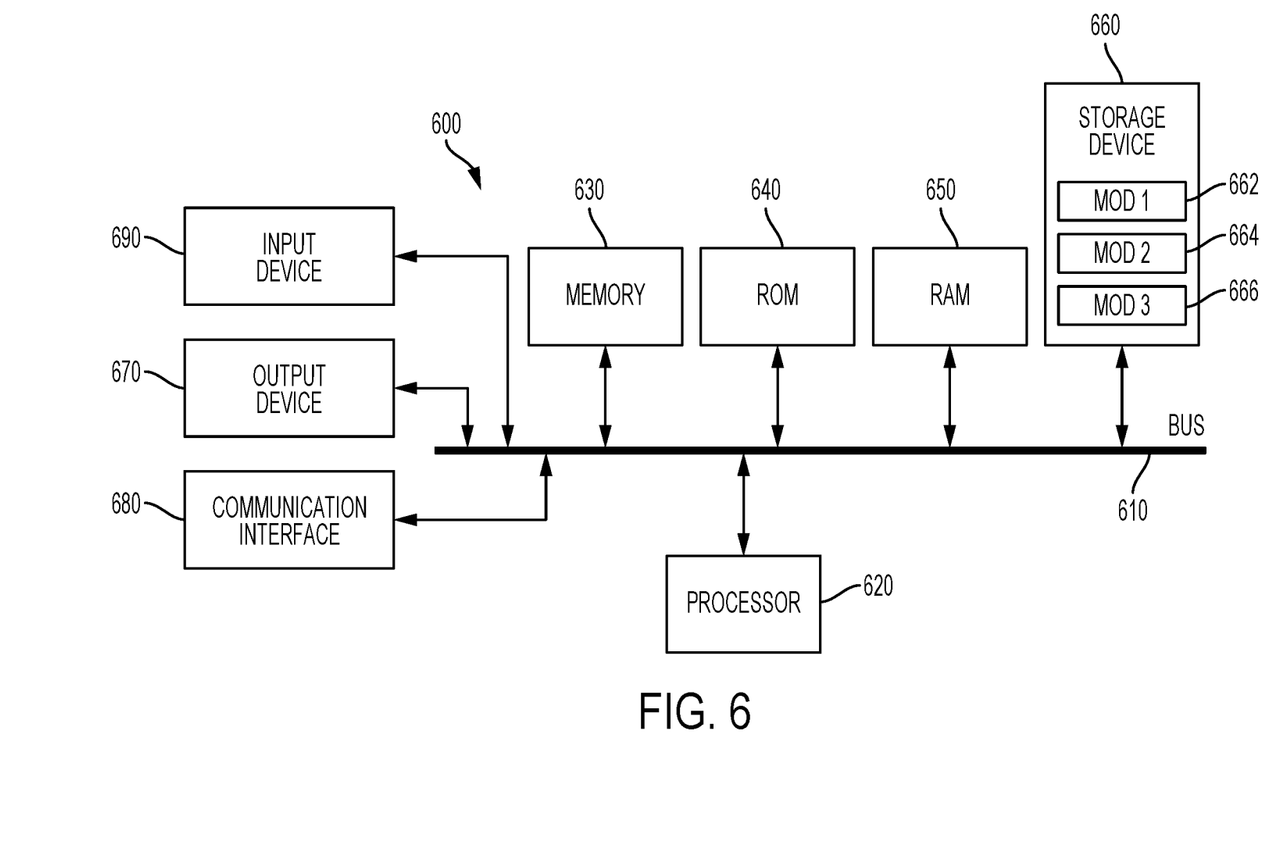
FIG. 6 illustrates an exemplary computer system which can be used as part of the restocking system.

The server, or other computing system, being used to perform the exemplary method of FIG. 5 can be the computing device illustrated in FIG. 6. With reference to FIG. 6, FIG. 6 illustrates an exemplary computing device 600, including a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

An exemplary restocking system can include: a plurality of imaging sensors configured to capture imaging data of items on respective shelves near a plurality of corresponding aisles on a periodic time interval; a computer system including a data storage device that is configured to store the imaging data of items and item-specific data of dimensions, weight, and minimum display of the items and a processor that is configured to execute computer-readable instructions to cause the computer system to: calculate a quantity of items on the shelves based on the captured imaging data and other item-specific data of the items; forecast when an emptiness threshold for a particular item on a shelf has been or will be reached based on the calculated quantity of the particular item on the shelf and based on historical rates of replenishment of the particular item and/or historical rates of the item being sold; generate an alert for restocking the item based on when the emptiness threshold is determined to be reached; and automatically restock the item based on the generated alert.

Such a restocking system can have additional configurations or modifications. For example, the restocking system can have a periodic time interval which has a default value of about every hour.

In another example, the restocking system can further include a plurality of motion detectors that are configured to detect human motion in the plurality of aisles, wherein the imaging sensors are activated to capture the images after a predetermined time of the motion detectors detecting human motion in the respective aisle. This predetermined time can, for example, be between 10-20 seconds, however the time interval can vary depending on the detected human motion in the aisle. In a similar configuration, the imaging sensors can be configured not to capture an image of the respective shelf of the corresponding aisle until at least when the corresponding motion detector has detected human motion in the aisle since the imaging sensor took the previous image.

In some configurations, the imaging sensor can include a camera that is positioned in the middle of the shelf to provide maximum coverage on items in a front portion of the shelf. In similar configurations, each shelf can have a rear portion that is adjacent to a wall and a front portion that is adjacent to an aisle, where each imaging sensor is configured to capture images at the front portion of the shelf.

In some configurations, the generated alert can be an electronic communication to a personal device. In such configurations, the periodic time interval for an aisle can decrease as the human motion that is detected in the aisle increases, or vary depending on the human motion in the corresponding aisle. Similarly, in such configurations, machine learning can be applied to train the interval at which each of the imaging sensors captures images of the items on the shelves based on detected human motion and based on the detected quantity of items on the shelf.

In some configurations, after constant human motion in an aisle is detected for a first predetermined time, the computer system can be configured to cause the imaging sensor to initiate constant surveillance of the aisle for the space of a second predetermined time. For example, the first predetermined time can be approximately two minutes, and the second predetermined time can be thirty seconds.

Other configuration variants can include a data storage device which stores a predefined image of the shelf in a full state, which can then be used to identify the current fullness of the shelf. Yet another configuration can include an imaging sensor configured to capture a barcode of products on the shelf. Another configuration can include the processor being configured to qualitatively and quantitatively recognize items on the shelf based on the images received by the imaging sensor.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving, from a plurality of imaging sensors, real-time imaging data, the real-time imaging data including images of a plurality of products on a store shelf, the plurality of products having a plurality of product types, wherein the plurality of imaging sensors:
   (1) detect motion of a human between an imaging sensor in the plurality of imaging sensors and the store shelf;
   (2) detect an end of the motion; and
   (3) wait a pre-determined amount of time after the end of the motion before recording the images;
storing the real-time imaging data in a database, wherein the database contains item-specific data associated with each product in the plurality of products, the item-specific data including dimensions, weight, and orientation information of the each product;
calculating, in real-time and for each product in the plurality of products, a current quantity of a product on the store shelf based on the real-time imaging data and the item-specific data;
calculating a current depletion rate for each product in the plurality of products based on the current quantity of the each product, a previous quantity of the each product, and a historical sales rate of the each product;
forecasting when an emptiness threshold for each product in the plurality of products will be reached based on the current depletion rate for the each product and the current quantity of the each product, to yield a plurality of forecasted replenishment times, each forecasted replenishment time in the plurality of forecasted replenishment times identifying when a respective product in the plurality of products will reach the emptiness threshold; and
at each forecasted replenishment time in the plurality of forecasted replenishment times:
   generating an alert for restocking the respective product via a pneumatic pipe system; and
   triggering the pneumatic pipe system to restock the respective product based on the alert.

2. The method of claim 1, wherein the predetermined time is in a range of between about 10-20 seconds.

3. The method of claim 1, wherein the forecasting further comprises using machine learning to forecast the plurality of forecasted replenishment times.

4. The method of claim 3, wherein the machine learning is updated on a periodic basis based on actual sales of the plurality of products.

5. The method of claim 1, wherein each imaging sensor in the plurality of imaging sensors comprises a camera that is positioned across an aisle from the store shelf.

6. The method of claim 1, wherein the pneumatic pipe system uses a diverter to place the respective product in a predetermined location on the store shelf.

7. The method of claim 1, wherein the plurality of imaging sensors are dormant until an aisle entrance motion detector detects a presence of an individual on an aisle containing the store shelf.

8. A restocking system, comprising:
a plurality of imaging sensors configured to capture imaging data of items on store shelves; a database having item-specific data stored, the item-specific data including dimensions, weight, and orientation information of the items;
a processor; and
a computer-readable storage medium having instructions stored which, when executed by the processor, cause the processor to perform operations comprising:
   storing the imaging data in the database;
   calculating a current quantity of a product on the store shelves based on the imaging data and the item-specific data;
   calculating a current depletion rate for the product based on the current quantity of the product, a previous quantity of the product, and a historical sales rate of the product;
   forecasting when an emptiness threshold for the product will be reached based on the current depletion rate and the current quantity of the product, to yield a forecasted replenishment time; and
   at the forecasted replenishment time:
      generating an alert for restocking the respective product via a pneumatic pipe system; and
      triggering the pneumatic pipe system to restock the respective product based on the alert.

9. The restocking system of claim 8, wherein the database stores a predefined image of the store shelves in a full state.

10. The restocking system of claim 8, wherein the plurality of imaging sensors:
   (1) detect motion of a human between an imaging sensor in the plurality of imaging sensors and the store shelf;
   (2) detect an end of the motion; and
   (3) wait a pre-determined amount of time after the end of the motion before recording the images.

11. The restocking system of claim 10, wherein the predetermined time is in a range of between about 10-20 seconds.

12. The restocking system of claim 9, wherein the forecasting further comprises using machine learning to forecast the plurality of forecasted replenishment times.

13. The restocking system of claim 12, wherein the machine learning is updated on a periodic basis based on actual sales of the plurality of products.

14. The restocking system of claim 9, wherein each imaging sensor in the plurality of imaging sensors comprises a camera that is positioned across an aisle from the store shelves.

15. The restocking system of claim 9, wherein the pneumatic pipe system uses a diverter to place the respective product in a predetermined location on the store shelf.

16. A non-transitory computer-readable storage medium having instructions stored which, when executed by a processor, cause the processor to perform operations comprising:
receiving, from a plurality of imaging sensors, real-time imaging data, the real-time imaging data including images of a plurality of products on a store shelf, the plurality of products having a plurality of product types, wherein the plurality of imaging sensors:

(1) detect motion of a human between an imaging sensor in the plurality of imaging sensors and the store shelf;
(2) detect an end of the motion; and
(3) wait a pre-determined amount of time after the end of the motion before recording the images;

storing the real-time imaging data in a database, wherein the database contains item-specific data associated with each product in the plurality of products, the item-specific data including dimensions, weight, and orientation information of the each product;

calculating, in real-time and for each product in the plurality of products, a current quantity of a product on the store shelf based on the real-time imaging data and the item-specific data;

calculating a current depletion rate for each product in the plurality of products based on the current quantity of the each product, a previous quantity of the each product, and a historical sales rate of the each product;

forecasting when an emptiness threshold for each product in the plurality of products will be reached based on the current depletion rate for the each product and the current quantity of the each product, to yield a plurality of forecasted replenishment times, each forecasted replenishment time in the plurality of forecasted replenishment times identifying when a respective product in the plurality of products will reach the emptiness threshold; and at each forecasted replenishment time in the plurality of forecasted replenishment times:
generating an alert for restocking the respective product via a pneumatic pipe system; and
triggering the pneumatic pipe system to restock the respective product based on the alert.

17. The non-transitory computer-readable storage medium of claim 16, wherein the predetermined time is in a range of between about 10-20 seconds.

18. The non-transitory computer-readable storage medium of claim 16, wherein the forecasting further comprises using machine learning to forecast the plurality of forecasted replenishment times.

19. The non-transitory computer-readable storage medium of claim 18, wherein the machine learning is updated on a periodic basis based on actual sales of the plurality of products.

20. The non-transitory computer-readable storage medium of claim 16, wherein each imaging sensor in the plurality of imaging sensors comprises a camera that is positioned across an aisle from the store shelf.

* * * * *